US010375664B2

(12) United States Patent
Doradla et al.

(10) Patent No.: US 10,375,664 B2
(45) Date of Patent: Aug. 6, 2019

(54) METHODS AND APPARATUS TO PROVIDE EXTENDED VOICE OVER INTERNET PROTOCOL (VOIP) SERVICES

(71) Applicant: AT&T Intellectual Property I, LP, Atlanta, GA (US)

(72) Inventors: Anil Doradla, Austin, TX (US); Sreenivasa Gorti, Austin, TX (US); David Wolter, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 99 days.

(21) Appl. No.: 15/407,462

(22) Filed: Jan. 17, 2017

(65) Prior Publication Data

US 2017/0126887 A1 May 4, 2017

Related U.S. Application Data

(63) Continuation of application No. 15/075,278, filed on Mar. 21, 2016, now Pat. No. 9,565,648, which is a
(Continued)

(51) Int. Cl.
| H04W 40/20 | (2009.01) |
| H04W 64/00 | (2009.01) |
| H04M 3/42 | (2006.01) |
| H04M 7/00 | (2006.01) |
| H04W 60/04 | (2009.01) |
| H04W 76/16 | (2018.01) |

(52) U.S. Cl.
CPC ....... *H04W 60/04* (2013.01); *H04M 3/42255* (2013.01); *H04M 7/006* (2013.01); *H04M 7/0069* (2013.01); *H04W 40/20* (2013.01); *H04W 64/00* (2013.01); *H04W 76/16* (2018.02)

(58) Field of Classification Search
CPC ............ H04M 3/42255; H04M 7/006; H04M 7/0069; H04M 2203/1091; H04W 40/20; H04W 60/04; H04W 64/00; H04W 76/16; H04L 12/66; H04L 29/06027; H04L 65/1026; H04L 65/1036; H04L 65/1069
See application file for complete search history.

(56) References Cited

U.S. PATENT DOCUMENTS 6,614,786 B1 9/2003 Byers
7,139,797 B1 11/2006 Yoakum et al.
(Continued)

OTHER PUBLICATIONS

United States Patent and Trademark Office, "Non-Final Office Action", issued in connection with U.S. Appl. No. 11/325,817, dated Nov. 27, 2009 (12 pages).
(Continued)

*Primary Examiner* — Ahmed Elallam
(74) *Attorney, Agent, or Firm* — Hanley, Flight & Zimmerman, LLC

(57) ABSTRACT

Methods and apparatus to provide extended voice over Internet protocol (VoIP) services are disclosed. An example method comprises determining a location of a cellular communication device, and selecting a route for a call to the cellular communication device or to a voice over Internet protocol (VoIP) communication device based upon the location, wherein the VoIP communication device is not implemented by the cellular communication device.

19 Claims, 5 Drawing Sheets

Related U.S. Application Data continuation of application No. 13/691,414, filed on Nov. 30, 2012, now Pat. No. 9,344,987, which is a continuation of application No. 11/325,817, filed on Jan. 5, 2006, now Pat. No. 8,345,624.

(56) References Cited

U.S. PATENT DOCUMENTS

| | | | |
|---|---|---|---|
| 7,395,336 | B1 | 7/2008 | Santharam et al. |
| 7,451,921 | B2* | 11/2008 | Dowling .............. G06Q 20/04 235/375 |
| 7,466,810 | B1* | 12/2008 | Quon .............. H04M 3/42229 379/201.01 |
| 7,502,615 | B2 | 3/2009 | Wilhoite et al. |
| 7,558,574 | B2 | 7/2009 | Feher |
| 7,711,094 | B1* | 5/2010 | Olshansky ............ H04M 7/006 379/45 |
| 7,773,584 | B2* | 8/2010 | Gorti ............ H04L 29/06027 370/352 |
| 7,809,381 | B2 | 10/2010 | Aborn et al. |
| 8,345,624 | B2 | 1/2013 | Doradla et al. |
| 9,264,290 | B2 | 2/2016 | Qiu et al. |
| 9,344,987 | B2 | 5/2016 | Doradla et al. |
| 2003/0076808 | A1 | 4/2003 | McNiff et al. |
| 2003/0100308 | A1 | 5/2003 | Rusch |
| 2003/0135624 | A1 | 7/2003 | McKinnon et al. |
| 2003/0193946 | A1 | 10/2003 | Gemert et al. |
| 2003/0224795 | A1 | 12/2003 | Wilhoite et al. |
| 2004/0152461 | A1 | 8/2004 | Schornack et al. |
| 2004/0203788 | A1 | 10/2004 | Fors et al. |
| 2005/0035857 | A1 | 2/2005 | Zhang et al. |
| 2005/0096024 | A1 | 5/2005 | Bicker et al. |
| 2005/0101261 | A1 | 5/2005 | Weinzweig et al. |
| 2005/0143016 | A1 | 6/2005 | Becker et al. |
| 2005/0147049 | A1 | 7/2005 | Ganesan |
| 2005/0190747 | A1* | 9/2005 | Sindhwani ............ H04W 88/06 370/352 |
| 2005/0213567 | A1* | 9/2005 | Mullins .................. H04M 3/22 370/352 |
| 2006/0043164 | A1* | 3/2006 | Dowling .............. G06Q 20/04 235/375 |
| 2006/0116127 | A1* | 6/2006 | Wilhoite ........... H04M 3/42246 455/442 |
| 2006/0121916 | A1 | 6/2006 | Aborn et al. |
| 2006/0264208 | A1 | 11/2006 | Moon et al. |
| 2006/0264213 | A1 | 11/2006 | Thompson |
| 2007/0049329 | A1* | 3/2007 | Mayer ................. H04M 1/2535 455/552.1 |
| 2007/0115935 | A1 | 5/2007 | Qiu et al. |
| 2008/0069069 | A1 | 3/2008 | Schessel et al. |
| 2009/0170519 | A1* | 7/2009 | Wilhoite ........... H04M 3/42246 455/436 |
| 2012/0224563 | A1 | 9/2012 | Zisimopoulos et al. |
| 2015/0257045 | A1 | 9/2015 | LaBauve et al. |

OTHER PUBLICATIONS

United States Patent and Trademark Office, "Final Office Action", issued in connection with U.S. Appl. No. 11/325,817, dated Jul. 7, 2010 (15 pages).

United States Patent and Trademark Office, "Final Office Action", issued in connection with U.S. Appl. No. 11/325,817, dated Jun. 21, 2011 (16 pages).

United States Patent and Trademark Office, "Non-Final Office Action", issued in connection with U.S. Appl. No. 11/325,817, dated Jan. 13, 2011 (15 pages).

United States Patent and Trademark Office, "Non-Final Office Action", issued in connection with U.S. Appl. No. 11/325,817, dated Feb. 2, 2012 (18 pages).

United States Patent and Trademark Office, "Notice of Allowance", issued in connection with U.S. Appl. No. 11/325,817, dated Aug. 21, 2012 (9 pages).

United States Patent and Trademark Office, "Final Office Action," issued in connection with U.S. Appl. No. 13/691,414, dated Sep. 18, 2015, 10 pages.

United States Patent and Trademark Office, "Non-Final Office Action," issued in connection with U.S. Appl. No. 13/691,414, dated Sep. 11, 2014, 9 pages.

United States Patent and Trademark Office, "Notice of Allowance," issued in connection with U.S. Appl. No. 13/691,414, dated Jan. 15, 2016, 8 pages.

United States Patent and Trademark Office, "Non-Final Office Action", issued in connection with U.S. Appl. No. 15/075,278, dated Jun. 22, 2016 (10 pages).

United States Patent and Trademark Office, "Notice of Allowance", issued in connection with U.S. Appl. No. 15/075,278, dated Sep. 29, 2016 (9 pages).

* cited by examiner

METHODS AND APPARATUS TO PROVIDE EXTENDED VOICE OVER INTERNET PROTOCOL (VOIP) SERVICES

CROSS-REFERENCE TO RELATED APPLICATIONS

This application arises from a Continuation of and claims priority to U.S. patent application Ser. No. 15/075,278 filed Mar. 21, 2016, which arises from a Continuation of and claims priority to U.S. patent application Ser. No. 13/691,414 filed Nov. 30, 2012, which arises from a Continuation of and claims priority to Ser. No. 11/325,817 filed Jan. 5, 2006. The contents of each of the foregoing is hereby incorporated by reference into this application as if set forth herein in full.

FIELD OF THE DISCLOSURE

This disclosure relates generally to voice over Internet protocol (VoIP) services and, more particularly, to methods and apparatus to provide extended VoIP services.

BACKGROUND OF THE DISCLOSURE

Many users subscribe to both wireless telephony services (e.g., cellular phone) and wired (i.e., wireline) telephony services such as plain old telephone service (POTS) and/or voice over Internet protocol (VoIP) service. Increasingly, subscribers desire a single telephone number that can automatically locate and follow the user. An example service sequentially routes a call via various telephony services, each usually having a different telephone number, in an attempt to locate the user. An example communication device is multi-mode and can be used to communicate via a variety of telephony technologies. For instance, some cellular phones can communicate via both cellular and wireless Internet-based technologies.

DETAILED DESCRIPTION OF THE DRAWINGS

Methods and apparatus to provide extended voice over Internet protocol (VoIP) services are disclosed. A disclosed example residential gateway includes a radio frequency (RF) detector to detect a presence of a cellular communication device, a service controller to enable a VoIP communication device when the cellular communication device is present, wherein the VoIP communication device and the cellular communication device are different devices. A disclosed example cellular communication device includes a cellular transceiver to communicatively couple the cellular communication device to a cellular base station and an RF identification (RFID) device to respond to queries from a residential gateway. A disclosed example system includes a database to store data indicative of whether a called device is located within a voice over Internet protocol (VoIP) service area and a gateway server to route a call to the telephone number via a cellular network or a VoIP network based upon the data.

A disclosed example method includes detecting a presence of a cellular communication device in a voice over Internet protocol (VoIP) service area and enabling a VoIP service for a VoIP communication device if the cellular communication device is present, wherein the VoIP communication device and the cellular communication device are physically separate devices. Another disclosed example method includes determining a location of a cellular communication device and selecting a route for a call to the cellular communication device or to a voice over Internet protocol (VoIP) communication device based upon the location, wherein the VoIP communication device is not implemented by the cellular communication device. Yet another disclosed example method includes determining a location of a cellular communication device, routing a call to the cellular communication device via a voice over Internet protocol (VoIP) network if the cellular communication device is present in a VoIP service area, and routing the call to cellular communication device via a cellular communication device if the cellular communication device is absent from the VoIP service area.

Figure 1:
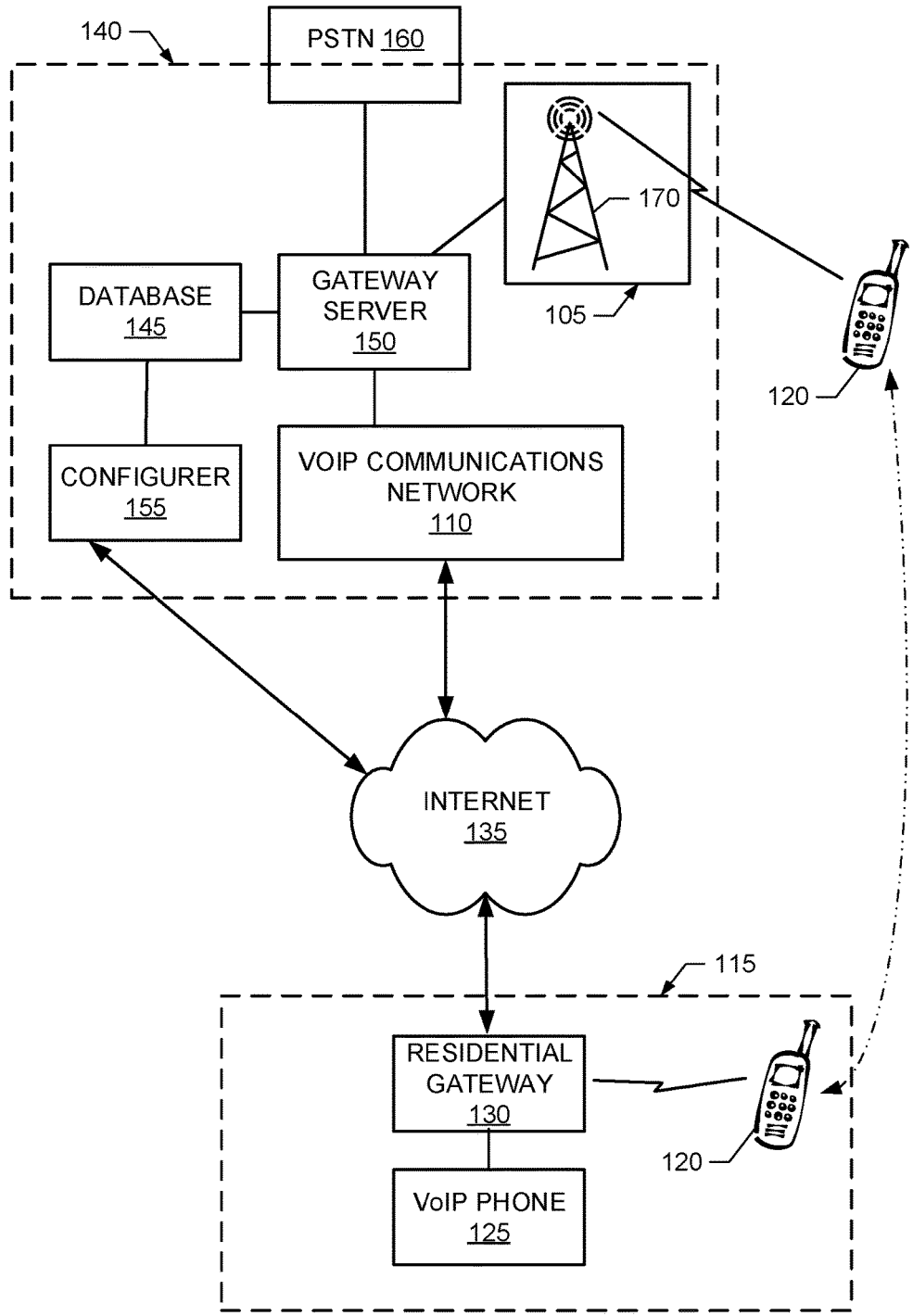
FIG. 1 is a schematic illustration of an example integrated cellular/voice over Internet protocol (VoIP) system constructed in accordance with the teachings of the invention.

FIG. 1 is a schematic illustration of an example integrated cellular/voice over Internet protocol (VoIP) system. In the illustrated example of FIG. 1, a user is assigned a telephone number and calls to that number are selectively routed to the user's location via either any variety of cellular communications network 105 or any variety of VoIP communications network 110. In the example system of FIG. 1, when the user's cellular terminal/communication device 120 is located within a VoIP service area 115 (e.g., their home or place of business), calls placed to the user's telephone number are routed via the VoIP communications network 110 to the user's VoIP terminal/communication device 125. The VoIP communication device 125 may be any of a variety of VoIP device such as, for example, a corded VoIP phone, a cordless VoIP phone, a VoIP enabled computer, etc. If the cellular communication device 120 supports, for example, Institute of Electrical and Electronics Engineers (IEEE) 802.11 (a.k.a. wireless fidelity (WiFi)) communications or IEEE 802.15 (a.k.a. Bluetooth), then the cellular communication device 120 may operate as a cordless VoIP phone while located within the VoIP service area 115. Further, while the cellular communication device 120 is located within the VoIP service area 115, the VoIP communication device 125 and/or the cellular communication device 120 are enabled to place outgoing telephone calls via the VoIP communications network 110.

In the example of FIG. 1, when the user's cellular communication device 120 is away from the VoIP service area 115, calls to the user's telephone number are routed via the cellular communications network 105 to the user's cellular communication device 120 and preferably not to the VoIP communication device 125. Thus, in the illustrated example of FIG. 1, the cellular communication device 120 can be thought of as an extension of the user's VoIP telephony service It will be readily apparent to persons of ordinary skill in the art that the cellular communication devices shown in FIG. 1 represent the same cellular device. In the example of FIG. 1, the cellular communication device 120 may be any variety of cellular device such as, for instance, a cellular handset, a cellular telephone, a personal digital assistant (PDA), a laptop, etc. An example portion of an example cellular communication device 120 is discussed below in connection with FIG. 2.

To communicatively couple the VoIP communication device 125 and/or the cellular communication device 120 to the VoIP communications network 110, the example system of FIG. 1 includes a residential gateway (RG) 130 located within the VoIP service area 115. In the illustrated example, the RG 130 detects the presence or absence of the user's cellular communication device 120 and provides an interface to the VoIP communication device 125 and/or the cellular communication device 120. The example RG 130 communicates with the VoIP communications network 110 via the Internet 135. Interfaces between the VoIP communication device 125 and/or the cellular communication device 120 and the RG 130, and/or the RG 130 and the Internet 135 may be implemented using any of a variety of devices, technologies and/or methods. For example, the VoIP communication device 125 may be coupled to the RG 130 via a conventional wired Ethernet interface, the RG 130 may be coupled to the Internet 135 via one of a variety of digital subscriber line (DSL) modem, cable modem, etc.

In the example system of FIG. 1, the example RG 130 periodically or aperiodically monitors for the presence of the cellular communication device 120. As discussed below in connection with FIGS. 2 and 3, the RG 130 monitors for the cellular communication device 120 by attempting to detect any of a variety of radio frequency (RF) signals that may be transmitted by the cellular communication device 120. Examples of such RF signals include RF signals transmitted by an RF identification (RFID) device, a WiFi signal, a Bluetooth signal, an IEEE 802.15.4 (a.k.a. Zigbee) signal, etc. The RG 130 of the illustrated example may determine the presence or absence of the cellular communication device 120 based on the detection of and/or lack of an RF signal transmitted by the cellular communication device 120. An example implementation of the RG 130 is discussed below in connection with FIG. 3.

Upon detecting the presence or absence of the cellular communication device 120, the RG 130 notifies a communications network (CN) 140, via the Internet 135 that the cellular communication device 120 is currently located within the VoIP service area 115. In the illustrated example of FIG. 1, the RG 130 notifies the CN 140 by notifying a configurer 155 (described below) associated with the CN 140. Having notified the CN 140 of the presence of the cellular communication device 120, the RG 130 of the illustrated example then configures and/or enables VoIP services to the VoIP communication device 125 and/or the cellular communication device 120. For example, the RG 130 may configure one or more interfaces and/or devices of the RG 130 to enable VoIP signals to flow between the VoIP communication device 125 and/or the cellular communication device 120 and the Internet 135. Likewise, upon detecting the absence of the cellular communication device 120, the RG 130 of the illustrated example notifies the CN 140 and then configures and/or disables VoIP services to the VoIP communication device 125 and/or the cellular communication device 120.

In the illustrated example of FIG. 1, the CN 140 may communicate with and/or contain any portion of any variety of Internet protocol (IP) multimedia system (IMS). As illustrated, the example CN 140 of FIG. 1 includes the cellular communications network 105 and the VoIP communications network 110. However, the CN 140 may contain only a portion of the cellular communications network 105 and/or the VoIP communications network 110, and/or may contain an interface to the cellular communications network 105 and/or the VoIP communications network 110. The example CN 140 of FIG. 1 further includes an interface to and/or a portion of a public switched telephone network (PSTN) 160.

In the illustrated example, when notified that the cellular communication device 120 is located within the VoIP service area 115, the CN 140 stops routing calls directed to the user's telephone number to the cellular communications network 105 and starts routing calls to VoIP communication devices currently associated with the user's telephone number via the VoIP communications network 110. For example, the CN 140 may maintain an entry in, for instance, a database 145, listing the active VoIP communication devices currently associated with the user's telephone number. The database 145 may further include, in the same or an additional entry, an indication of whether or not the cellular communication device 120 is located within the VoIP service area 115. Information may be stored and/or indexed in the database 145 using any of a variety of data structures, tables, etc.

In the illustrated example of FIG. 1, each new call to the user's telephone number received by the example CN 140 of FIG. 1 is routed to a gateway server 150. A new call may enter into the example CN 140 via any of a variety of paths and/or routes, such as, for example, from a public switched telephone network (PSTN) 160, from the cellular communications network 105, from the VoIP communications network 110, etc. Upon receipt of a new call and based upon the user's telephone number, the example gateway server 150 of FIG. 1 queries the database 145 to determine the current location of the cellular communication device 120. If the cellular communication device 120 is currently located outside the VoIP service area 115, the example gateway server 150 routes the call to the cellular communication device 120 via the cellular communications network 105. If the cellular communication device 120 is currently located inside the VoIP service area 115, the gateway server 150 of FIG. 1 routes the call to each of the current VoIP communication devices associated with the user's telephone number as reflected in the database 145 via the VoIP communications network 110.

In the illustrated example, the gateway server 150 may be, for instance, a gateway mobile switching center (GMSC) and/or may implement a media gateway control function (MGCF). In the illustrated example of FIG. 1, the gateway server 150 may be associated with the VoIP communications network 110, the cellular communications network 105 and/or any other communications network. For example, the user's telephone number may be associated with a VoIP communication service such that if the cellular communication device 120 is not located within the VoIP service area 115 calls placed to the telephone number are routed to the cellular communications network 105. Alternatively, the user's telephone number may be associated with a cellular communication service such that if the cellular communication device 120 is located within the VoIP service area 115 calls placed to the telephone number are routed to the VoIP communications network 110. Other examples abound.

To update the database 145 in response to notifications and/or information from the RG 130, the example CN 140 of FIG. 1 includes the configurer 155. The example configurer 155 of FIG. 1 receives notifications and/or configuration information from the RG 130 such as, for example, that the cellular communication device 120 has entered the VoIP service area 115, that the cellular communication device 120 has left the VoIP service area 115, a session initiated protocol (SIP) registration of a VoIP communication device, a SIP de-registration of a VoIP communication device, a list of active and/or enabled VoIP communication devices, etc. Upon receipt of such notifications and/or configuration information and, using any of a variety of techniques, the configurer 155 updates the database 145.

In the illustrated examples of FIG. 1, the configurer 155 having received a location change notification from the RG 130, updates in the database 145 the list of VoIP communication devices 125 allowed and/or enabled to make and/or place telephone calls. In particular, when the cellular communication device 120 is located within the VoIP service area 115, the list is updated to enable all currently registered VoIP communication devices 125 associated with the user's telephone number. Likewise, when the cellular communication device 120 leaves the VoIP service area 115, the list is updated to disabled the registered VoIP communication devices 125.

Figure 3:
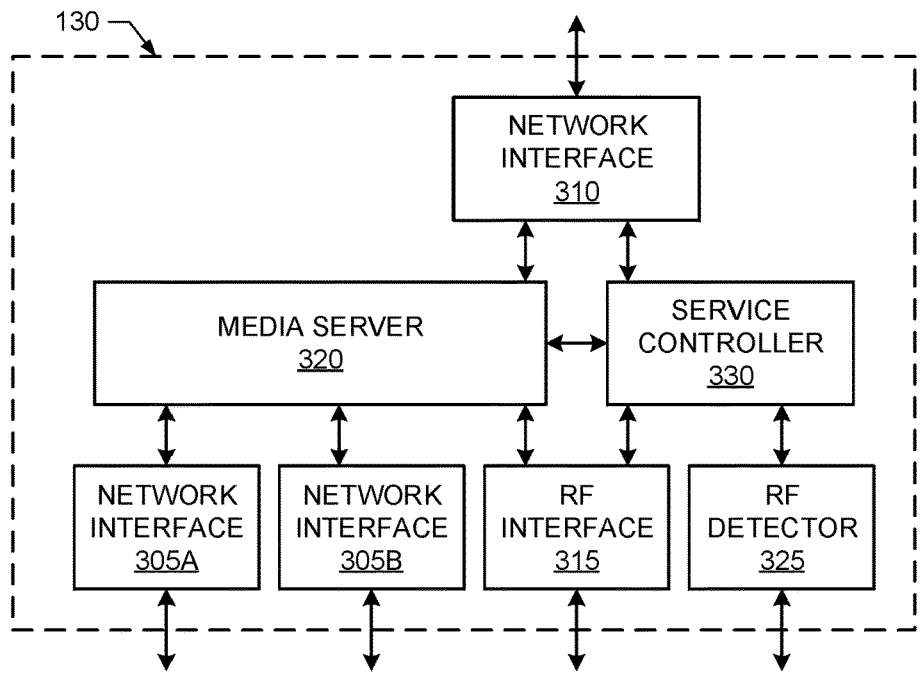
FIG. 3 illustrates an example manner of implementing the example residential gateway (RG) of FIG. 1.

In the examples of FIGS. 1 and 3, the configurer 155 notifies the RG 130 as VoIP communication devices 125 are enabled and/or disabled. In response, RG 130 allows and/or disallows calls to be placed to and/or received by the enabled and/or disabled VoIP communication devices 125. Alternatively, the RG 130 automatically enables and/or disables the VoIP communication devices 125 as the cellular communication device 120 is detected and/or is absent.

As an alternative, upon detecting the presence of the cellular communication device 120, the RG 130 may notify the configurer 155 that the cellular communication device 120 has entered the VoIP service area 115 and then provide a current list of valid and/or available list of VoIP communication devices to the configurer 155. In response, the configurer 155 updates the database 145, and notifies the gateway server 150 to route new calls placed to the user's telephone number according to the new information. Alternatively, instead of sending a list of VoIP communication devices, the RG 130 may serve as a SIP proxy and perform a SIP registration for each of the VoIP communication device 125 and/or the cellular communication device 120. When the cellular communication device 120 leaves the VoIP service area 115, the RG 130 may notify the configurer 155 and provide an empty list of VoIP communication devices, a list of barred VoIP communication devices, or perform a SIP de-registration for each registered VoIP communication device. The configurer 155 may notify the gateway server 150 by, for example, updating the database 145 and/or actively by, for example, sending a message to the gateway server 150.

The example cellular communications network 105 and the example VoIP communications network 110 of FIG. 1 may be implemented by any of a variety of communication devices, switches, protocols, systems and/or technologies. For instance, as illustrated in FIG. 1, the example cellular communications network 105 includes a cellular base station 170 that can transmit cellular signals to, and receive cellular signals from, the cellular communication device 120.

Figure 2:
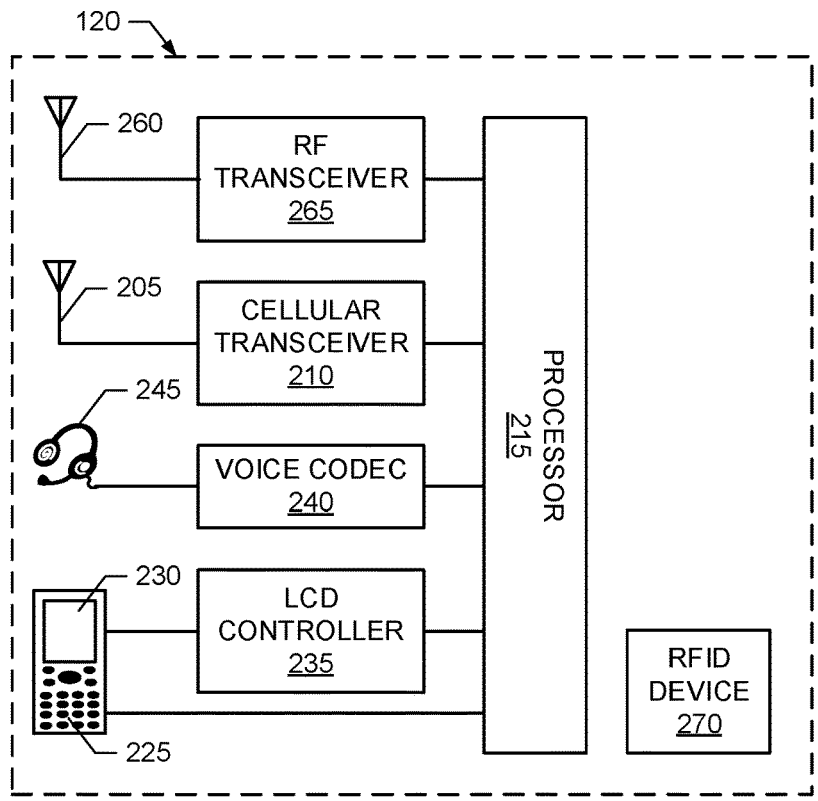
FIG. 2 illustrates an example manner of implementing the example cellular communication device of FIG. 1.

FIG. 2 illustrates an example manner of implementing at least a portion of the example cellular communication device 120 of FIG. 1. To support wireless communications with the cellular communications network 105 (FIG. 1), the example cellular communication device 120 of FIG. 2 includes any of a variety of cellular antennas 205 and any of a variety of cellular transceivers 210. In particular, the antenna 205 and the cellular transceiver 210 are able to receive, demodulate and decode cellular signals transmitted to the example cellular communication device 120 by, for instance, the example cellular base station 170 (FIG. 1). Likewise, the cellular transceiver 210 and the cellular antenna 205 are able to encode, modulate and transmit cellular signals from the example cellular communication device 120 to the cellular base station 170.

To process received and decoded signals and to provide data for transmission, the illustrated example cellular communication device 120 of FIG. 2 includes a processor 215. The processor 215 may be any of a variety of processors such as, for example, a digital signal processor (DSP), an advanced reduced instruction set computing (RISC) machine (ARM) processor, a microprocessor, a microcontroller, etc. In general, the processor 215 executes machine readable instructions stored in a memory to control the example cellular communication device 120 of FIG. 2 and/or to provide one or more of a variety of services and/or functionalities implemented and/or provided by the example cellular communication device 120 of FIG. 2.

In addition to handling receive and/or transmit data, the processor 215 may receive user inputs or selections, and/or provide a user interface for a user of the example cellular communication device 120. For example, the processor 215 may receive inputs and/or selections made by a user via a keyboard 225, and/or provide a user interface on a display 230 (e.g., a liquid crystal display (LCD) 230) via, for instance, an LCD controller 235. Other example input devices include a touch screen, a mouse, etc. The display 230 may be used to display any of a variety of information such as, for example, menus, caller identification information, a picture, video, a list of telephone numbers, a list of video and/or audio channels, phone settings, etc.

To provide, for example, telephone services, the example cellular communication device 120 of FIG. 2 includes any of a variety of voice coder-decoders (codecs) 240 and any variety of input and/or output devices such as, for instance, a jack for a headset 245. In particular, the processor 215 can receive a digitized and/or compressed voice signal from the headset 245 via the voice codec 240, and then transmit the digitized and/or compressed voice signal via the cellular transceiver 210 and the antenna 205 to the cellular base station 170. Likewise, the processor 215 can receive a digitized and/or compressed voice signal from the cellular base station and output a corresponding analog signal via, for example, the headset 245 for listening by a user.

To support additional or alternative communication services, the example cellular communication device 120 of FIG. 2 may include any of a variety and/or number of RF antennas and/or RF transceivers. In the illustrated example, the example RF antenna 260 and the example RF transceiver 265 support wireless communications based on the IEEE 802.11 (a.k.a., WiFi) standard. Alternatively, the cellular antenna 205 may be used by the RF transceiver 265. Another example RF transceiver 265 supports communications based on the IEEE 802.15.4 (a.k.a., Zigbee) standard. Alternatively, an RF transceiver 265 may support communications based on multiple communication standards and/or protocols.

In the illustrated example of FIG. 2, the processor 215 may use the RF transceiver 265 to communicate with, among other devices, the RG 130 (FIG. 1). For instance, the example RF transceiver 265 of FIG. 2 may be used to enable the example cellular communication device 120 to operate as a VoIP communication device while located within the VoIP service area 115 (FIG. 1). In particular, the processor 215 can receive a digitized and/or compressed voice signal from the headset 245 via the voice codec 240, and then transmit the digitized and/or compressed voice signal via the RF transceiver 265 and the antenna 260 to the RG 130. Likewise, the processor 215 can receive a digitized and/or compressed voice signal from the RG 130 and output a corresponding analog signal via, for example, the headset 245 for listening by a user.

A cellular communication device 120 that includes a cellular transceiver 210 and an RF transceiver 265 is commonly referred to as a dual-mode handset (DMH). In the example of FIG. 1, the RG 130 may use RF signals transmitted via the RF transceiver 265 and the antenna 260 to detect the presence or absence of the cellular communication device 120.

Additionally or alternatively, as illustrated in FIG. 2, the example cellular communication device 120 may include any of a variety of RFID devices 270. An example RFID device 270 is a small very thin package with adhesive on one side. Other example RFID devices abound. When the RFID device 270 detects and/or receives an RFID query signal, the RFID device 270 transmits a response RF signal. Thus, for an example cellular communication device 120 including an RFID device 270, the RG 130 may periodically query for the presence of the RFID device 270 and use a response transmitted by the RFID device 270 to determine if the cellular communication device 120 is present in the VoIP service area 115.

In the illustrated examples of FIGS. 1 and 2, the RFID device 270 may be included in the cellular communication device 120 during manufacturing or may be attached to, embedded within, or adhered to the cellular communication device 120 when, for example, the RG 130 is being installed and/or configured. For example, any of a variety of off-the-shelf cellular communication devices may be used with the example system illustrated in FIG. 1. When the RG 130 is installed, an RFID device 270 may be adhered inside the battery compartment of the cellular communication device 120. The RG 130 is trained and/or configured with the identification information of the RFID device 270. In this example, the off-the-shelf cellular communication device 120 requires no further modifications, configuration, upgrade, software updates, etc. during installation and/or configuration of the RG 130 to operate within the example system of FIG. 1, that is, to serve as an extension of a VoIP communication service. In another example, the RG 130 and/or the cellular communication device 120 may be provisioned and/or configured by an installer and/or user to facilitate VoIP communication services to the example cellular communication device 120 when the cellular communication device 120 is within the VoIP service area 115.

Although an example cellular communication device 120 has been illustrated in FIG. 2, cellular communication devices may be implemented using any of a variety of other and/or additional components, circuits, modules, etc. Further, the, the components, circuits, modules, elements, etc. illustrated in FIG. 2 may be combined, re-arranged, eliminated and/or implemented in any of a variety of ways. For simplicity and ease of understanding, the following discussion references the example cellular communication device 120 of FIG. 2, but any cellular communication device could be used.

FIG. 3 illustrates an example manner of implementing at least a portion of the example RG 130 of FIG. 1. To communicatively couple the example RG 130 of FIG. 3 with one or more VoIP communication devices 125, the example RG 130 includes any of a variety of network interfaces, two of which are shown with reference numerals 305A and 305B in FIG. 3. The network interfaces 305A and 305B may implement, for example, one or more wired Ethernet interfaces.

To communicatively couple the example RG 130 of FIG. 3 to the CN 140 via the Internet 135, the example RG 130 includes any of a variety of network interfaces 310. In an example, the network interface 310 is implemented by any variety of wired Ethernet interface and the network interface 310 couples the RG 130 to the Internet 135 via, for example, any variety of DSL modem. Alternatively, the network interface 310 may implement, for example, a DSL modem. Of course, other wired and/or wireless communication technologies, standards, protocols and/or devices may be implemented by the network interfaces 305A, 305B and 310. For example, the network interface 310 may connect to and/or implement a cable modem, an integrated services digital network (ISDN) modem, an IEEE 802.16 (a.k.a. WiMax) modem, etc.

To communicatively couple the example RG 130 to one or more VoIP communication devices 125 and/or cellular communication devices 120, the example RG 130 of FIG. 3 is further provided with an RF interface 315. In the illustrated example of FIG. 3, the RF interface 315 implements any of a variety of RF interfaces 315 such as, for example, an interface operating according to the IEEE 802.11 (a.k.a., WiFi) standard, the IEEE 802.15.4 (a.k.a., Zigbee) standard, etc. As discussed above in connection with FIGS. 1 and 2, the RF interface(s) 315 may be used to facilitate VoIP communications between cellular communication devices 120 and/or VoIP communication devices 125 and the CN 140.

To couple VoIP signals received from and/or transmitted to VoIP communication devices 125 and/or cellular communication devices 120 communicatively coupled to the example RG 130 via the network interfaces 305A and 305B and/or the RF interface 315, the example RG 130 of FIG. 3 includes any of a variety of media servers 320. Among other things, an example media server 320 of FIG. 3 facilitates the combining of signals associated with any VoIP communication devices 125 and/or cellular communication devices 120 communicatively coupled to the example RG 130 using any of a variety of techniques. For example, two persons may simultaneously use two different VoIP communication devices attached to the illustrated example RG 130 to participate in a single telephone call.

To facilitate detection of the presence or absence of a cellular communication device 120, the example RG 130 of FIG. 3 includes any of a variety of RF detectors 325. The RF detector(s) 325 are configurable to detect any of a variety of RF signals transmitted by the example cellular communication device 120. An example RF detector 325 queries and then detects signals transmitted by a nearby RFID device (e.g., the RFID device 270 of FIG. 2). The example RG 130 of FIG. 3 may include any variety and/or number of RF interfaces 315 and/or RF detectors 325. For example, the RG 130 of FIG. 3 includes an RF interface 315 used to detect and implement both WiFi and Zigbee communications, and an RF detector 325 to detect the RFID device 270. Other example combinations will be readily apparent to persons of ordinary skill in the art.

To configure and/or control the illustrated example RG 130 in response to the detection of RF signals (e.g., in response to detection output signals from the RF interface(s) 315 and/or the RF detector(s) 325), the example RG 130 includes a service controller 330. In the illustrated example, the service controller 330 receives the detection output signals from the RF interface(s) 315 and/or the RF detector(s) 325 to determine if an authorized cellular communication device 120 is located within the VoIP service area 115 (FIG. 1). When the cellular communication device 120 enters and/or leaves the VoIP service area 115, the service controller 330 of the illustrated example notifies the CN 140 via the network interface 310 of the change in location. In the illustrated examples of FIGS. 1 and 3, the CN 140 having received a location change notification from the RG 130, updates in the database 145 the list of VoIP communication devices 125 allowed and/or enabled to make and/or place telephone calls. In particular, when the cellular communication device 120 is located within the VoIP service area 115, the list is updated to enable all currently registered VoIP communication devices 125 associated with the user's telephone number. Likewise, when the cellular communication device 120 leaves the VoIP service area 115, the list is updated to disabled the registered VoIP communication devices 125.

In the examples of FIGS. 1 and 3, the CN 140 notifies the RG 130 as VoIP communication devices 125 are enabled and/or disabled. In response, service controller 330 allows and/or disallows calls to be placed and/or received by the VoIP communication devices 125. Alternatively, the service controller 330 automatically enables and/or disables the VoIP communication devices 125 as the cellular communication device 120 is detected and/or absent.

In another example, the service controller 330 may also provide to the CN 140 a list of VoIP communication devices currently attached to the RG 130 to the configurer 155 (FIG. 1) and/or serve as a SIP proxy to perform SIP registrations or SIP de-registrations as the cellular communication device 120 enters or leaves the VoIP service area 115, respectively.

The service controller 330 of the illustrated example also configures the media server 320 to enable VoIP signals to flow between the network interfaces 305A, 305B and/or the network interface 310, thereby enabling and/or disabling VoIP communications to any attached VoIP communication devices.

Figure 4:
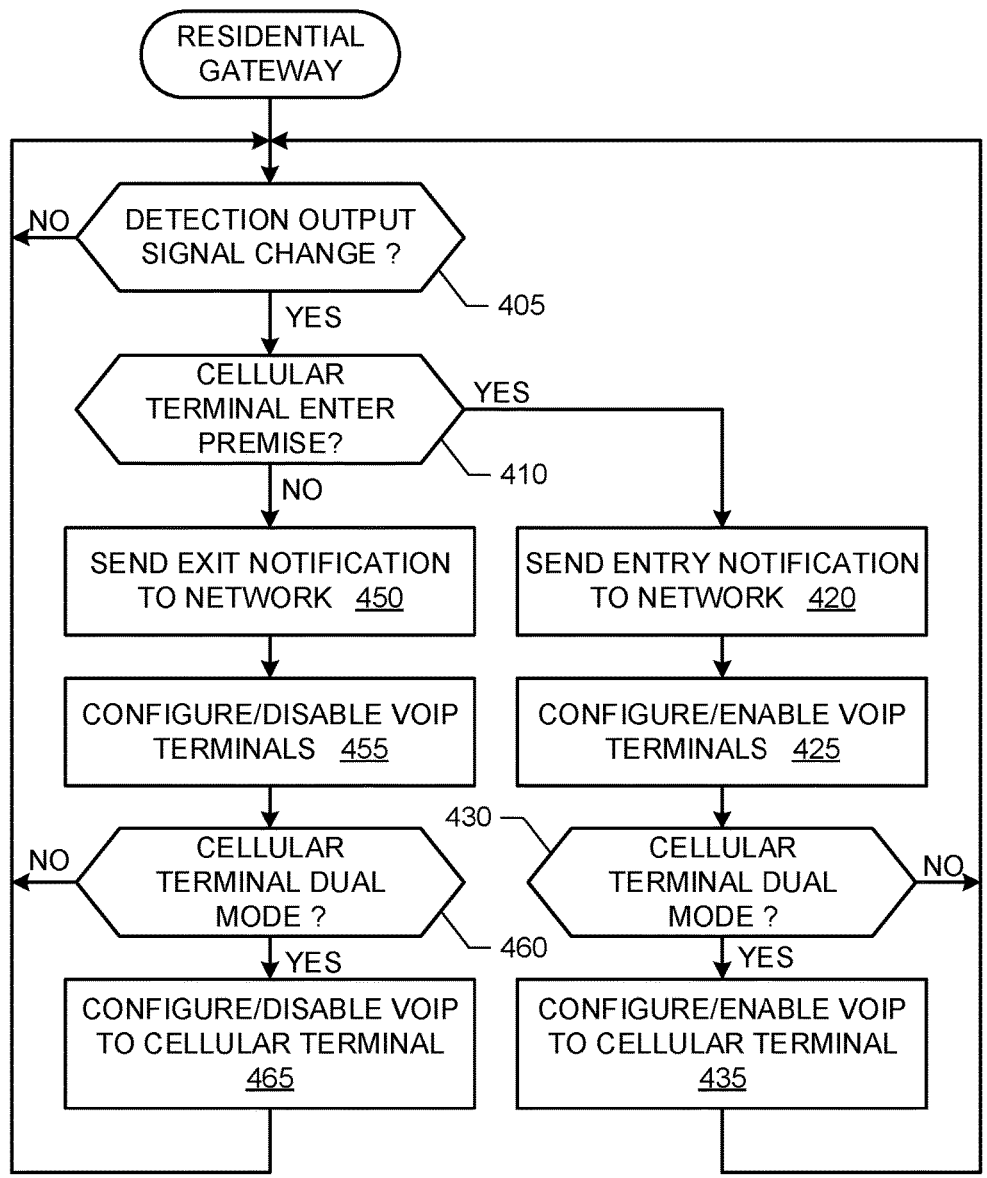
FIG. 4 is a flowchart representative of example machine readable instructions which may be executed to implement the example residential gateway of FIGS. 1 and/or 3.
Figure 5:
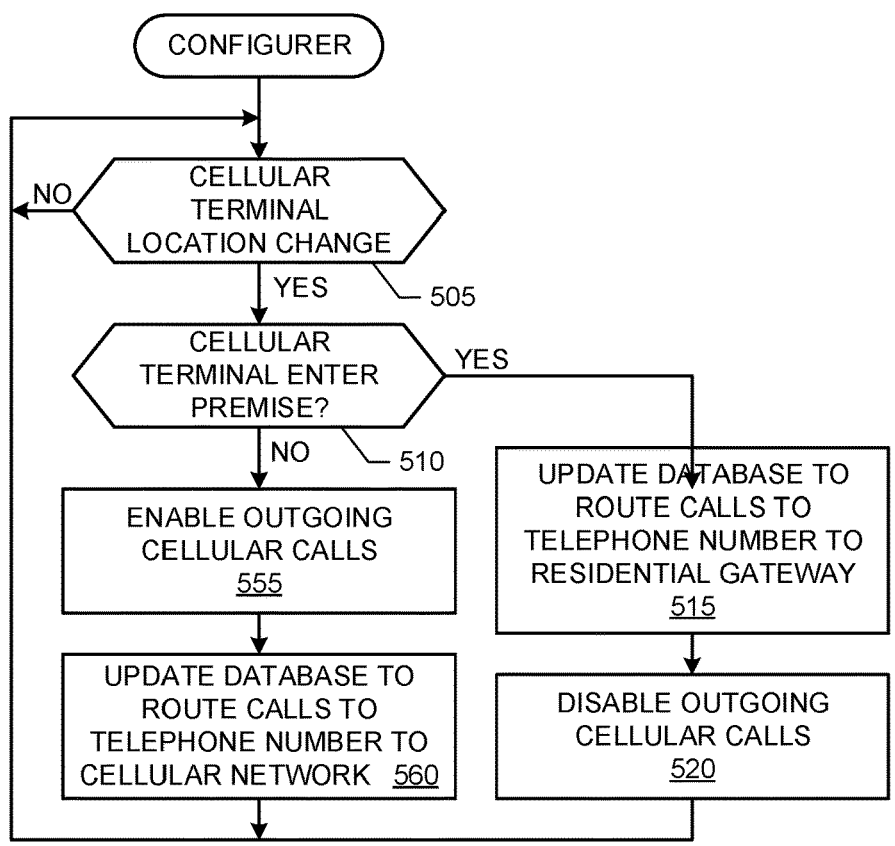
FIG. 5 is a flowchart representative of example machine readable instructions which may be executed to implement the example configurer of FIG. 1.
Figure 6:
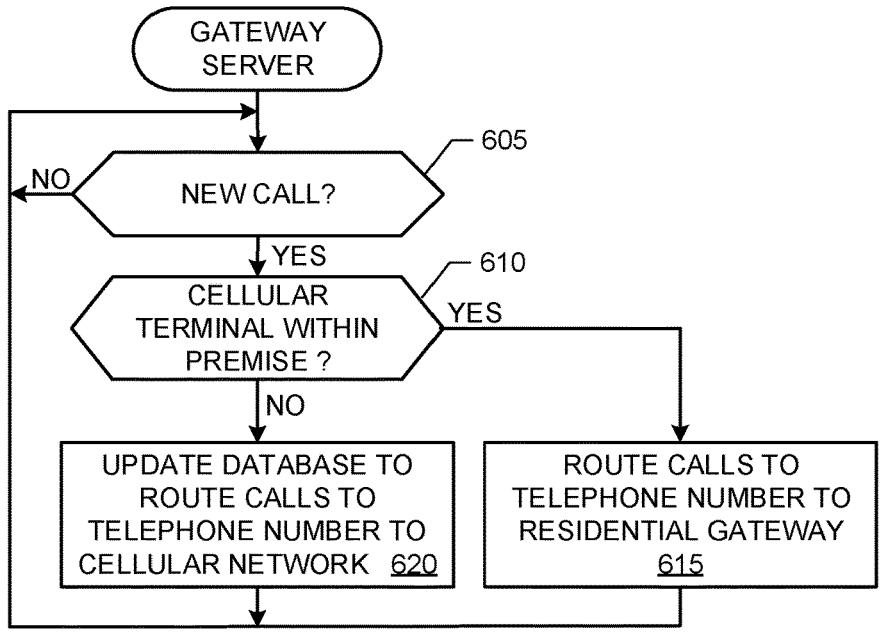
FIG. 6 is a flowchart representative of example machine readable instructions which may be executed to implement the example gateway server of FIG. 1.

FIGS. 4, 5 and 6 illustrate flowcharts representative of example machine readable instructions that may be executed to implement the example RG 130, the example configurer 155 and the example gateway server 150 and/or, more generally, the example system of FIG. 1. The example machine readable instructions of FIGS. 4-6 may be executed by a processor, a controller and/or any other suitable processing device. For example, the example machine readable instructions of FIGS. 4-6 may be embodied in coded instructions stored on a tangible medium such as a flash memory, or random access memory (RAM) associated with a processor (e.g., the processor 710 shown in the example processor platform 700 and discussed below in conjunction with FIG. 7). Alternatively, some or all of the example flowcharts of FIGS. 4-6 may be implemented using an application specific integrated circuit (ASIC), a programmable logic device (PLD), a field programmable logic device (FPLD), discrete logic, hardware, firmware, etc. Also, some or all of the example flowcharts of FIGS. 4-6 may be implemented manually or as combinations of any of the foregoing techniques, for example, a combination of firmware, software and/or hardware. Further, although the example machine readable instructions of FIGS. 4-6 are described with reference to the flowcharts of FIGS. 4-6, persons of ordinary skill in the art will readily appreciate that many other methods of implementing the example RG 130, the example configurer 155, the example gateway server 150 and/or, more generally, the example system of FIG. 1 may be employed. For example, the order of execution of the blocks may be changed, and/or some of the blocks described may be changed, eliminated, sub-divided, or combined. Additionally, persons of ordinary skill in the art will appreciate that the example machine readable instructions of FIGS. 4-6 be carried out sequentially and/or carried out in parallel by, for example, separate processing threads, processors, devices, circuits, etc.

The example machine readable instructions of FIG. 4 begin with the service controller 330 determining if a change in any detection output signal has occurred (block 405). For instance, the service controller 330 may check detection output signals from some or all of the RF interface(s) 315 and/or the RF detector(s) 325. If no change has been detected (block 405), the service controller 330 continues waiting.

If a detection output signal change has occurred (block 405), the service controller 330 determines if the cellular communication device 120 has entered the VoIP service area 115 (block 410). If the cellular communication device 120 has entered the VoIP service area 115 (block 410), the service controller 330 sends an entry notification to the configurer 155 (block 420) and configures and/or enables VoIP communication services to the VoIP communication devices 125 associated with the RG 130 (block 425). If the cellular communication device 120 is a DMH (block 430), the service controller 330 configures and/or enables VoIP services to the cellular communication device 120 (block 435). Control then returns to block 405 to wait for another detection output signal change. If the cellular communication device 120 is not a DMH (block 430), control returns to block 405 without passing through block 435.

Returning to block 410, if the cellular communication device 120 has left the VoIP service area 115, the service controller 330 sends an exit notification to the configurer 155 (block 450) and disables VoIP communications to the VoIP communication devices associated with the RG 130 (block 455). Alternatively, the associated VoIP communication devices remain at least partially enabled (e.g., enabled for emergency (e.g., 911) outgoing calls). If the cellular communication device 120 is a DMH (block 460), the service controller 330 disables VoIP services to the cellular communication device 120 (block 465). Control then returns to block 405 to wait for another detection output signal change. If the cellular communication device 120 is not a DMH (block 460), control returns to block 405 without passing through block 465.

The example machine readable instructions of FIG. 5 begin with the configurer 155 waiting to receive notification that a cellular communication device (e.g., the cellular communication device 120) has changed location (i.e., entered and/or left the VoIP service area 115) (block 505). If no notification has been received (block 505), the configurer 155 continues waiting.

If a notification has been received (block 505), the configurer 155 determines if the cellular communication device 120 has entered or left the VoIP service area 115 (block 510). If the cellular communication device 120 has entered the VoIP service area 115 (block 510), the configurer 155 updates the database 145 to route calls placed to the user's telephone number to the VoIP communication devices associated with the user's telephone number in the VoIP communications network 110 (block 515). The configurer 155 also disables outgoing cellular calls from the cellular communication device 120 (block 520). Control then returns to block 505 to await another notification.

Returning to block 510, if the cellular communication device 120 has exited the VoIP service area 115, the configurer 155 enables outgoing cellular calls from the cellular communication device 120 (block 555). The configurer 155 updates the database 145 to route calls placed to the user's telephone number via the cellular communications network 105 to the cellular communication device 120 (block 560). Control then returns to block 505 to await another notification.

The example machine readable instructions of FIG. 6 begin with the gateway server 150 waiting to receive a new call (block 605). If no new call is received (block 605), the gateway server 150 continues waiting.

When a new call is received (block 605), the gateway server 150, uses the user's telephone number and information to access the data stored in the database 145 to determine if a cellular communication device 120 is located within or without the VoIP service area 115 (block 610). If the cellular communication device 120 is within the VoIP service area 115 (block 610), the gateway server 150 routes the call via the VoIP communications network 110 to the RG 130 (block 615). Control then returns to block 605 to await another new call.

Returning to block 610, if the cellular communication device 120 is not within the VoIP service area 115, the gateway server 150 routes the call via the cellular communications network 105 to the cellular communication device 120 (block 620). Control then returns to block 605 to await another new call.

Figure 7:
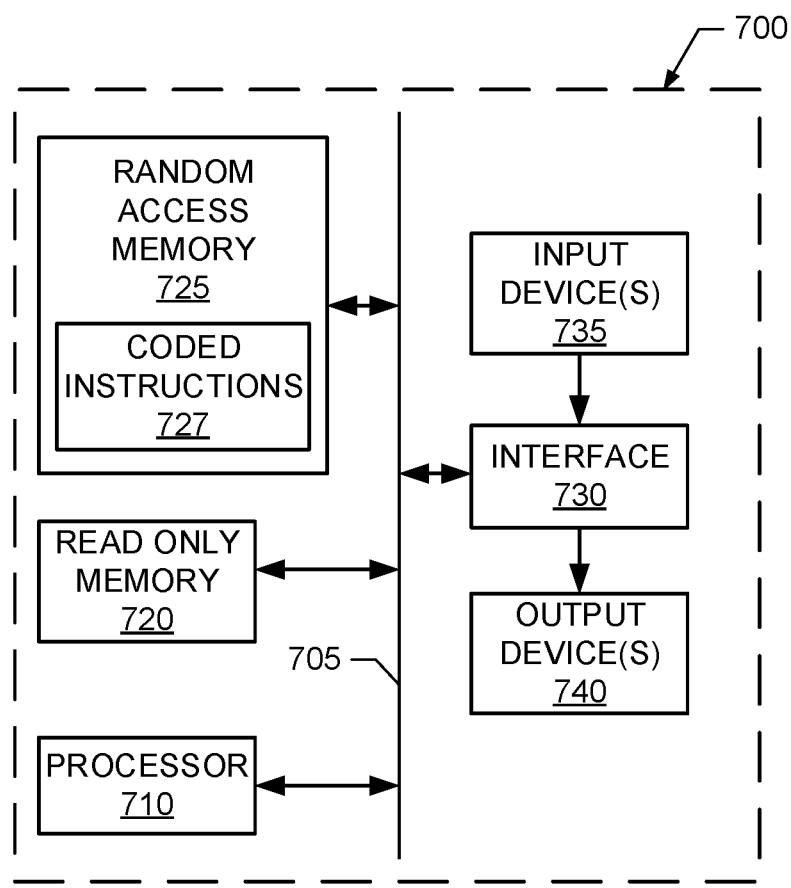
FIG. 7 is a schematic illustration of an example processor platform that may be used and/or programmed to execute the example machine readable instructions represented by FIGS. 4, 5 and/or 6 to implement the example residential gateway of FIGS. 1 and/or 3, the example configurer of FIG. 1 and/or the example gateway server of FIG. 1, respectively.

FIG. 7 is a schematic diagram of an example processor platform 700 that may be used and/or programmed to implement the example RG 130, the example configurer 155, the example gateway server 150 and/or, more generally, the example system of FIG. 1. For example, the processor platform 700 can be implemented by one or more general purpose microprocessors, microcontrollers, etc.

The processor platform 700 of the example of FIG. 7 includes a general purpose programmable processor 710. The processor 710 executes coded instructions 727 present in main memory of the processor 710 (e.g., within a RAM 725). The processor 710 may be any type of processing unit, such as a microprocessor from the Intel®, AMD®, IBM®, or SUN® families of microprocessors. The processor 710 may implement, among other things, the machine readable instructions of FIGS. 4-6 to implement the example RG 130, the example configurer 155, the example gateway server 150 and/or, more generally, the example system of FIG. 1.

The processor 710 is in communication with the main memory (including a read only memory (ROM) 720 and the RAM 725) via a bus 705. The RAM 725 may be implemented by dynamic random access memory (DRAM), Synchronous DRAM (SDRAM), and/or any other type of RAM device, and ROM may be implemented by flash memory and/or any other desired type of memory device. The ROM 720 may be implemented by flash memory and/or any other desired type of memory device. Access to the memory 720 and 725 is typically controlled by a memory controller (not shown) in a conventional manner.

The processor platform 700 also includes a conventional interface circuit 730. The interface circuit 730 may be implemented by any type of well-known interface standard, such as an external memory interface, serial port, general purpose input/output, etc.

One or more input devices 735 and one or more output devices 740 are connected to the interface circuit 730. The input devices 735 and output devices 740 may be used, for example, to implement interfaces between the gateway server 150 and the database 145; between the configurer 155 and the Internet 135; between the service controller 330 and the RF detector(s) 325, the RF interface(s) 315, the network interface 310, the media server 320; etc.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. For instance, IEEE 802.11, IEEE 802.15.4, media servers, gateway servers, etc. represent examples of the current state of the art. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
   memory including machine readable instructions; and
   a processor to execute the machine readable instructions to perform operations including:
      determining a location of a cellular communication device;
      registering a voice over Internet protocol communication device to a voice over Internet protocol service in response to determining the location of the cellular communication device; and
      routing a call for the cellular communication device to the voice over Internet protocol communication device based on the location of the cellular communication device, the voice over Internet protocol communication device not being implemented by the cellular communication device.

2. The apparatus as defined in claim 1, wherein the operations further include updating a list of voice over Internet protocol communication devices associated with a telephone number based on the location.

3. The apparatus as defined in claim 1, wherein the operations further include routing the call to the voice over Internet protocol communication device if the voice over Internet protocol communication device has at least one of a valid session initiated protocol registration or is enabled.

4. The apparatus as defined in claim 1, wherein the operations further include routing the call to the voice over Internet protocol communication device if the cellular communication device is located in a voice over Internet protocol service area with the voice over Internet protocol communication device.

5. The apparatus as defined in claim 1, wherein the operations further include receiving a location notification for the cellular communication device, wherein the location is determined from the location notification.

6. The apparatus as defined in claim 1, wherein the operations further include associating the cellular communication device and the voice over Internet protocol communication device with a same telephone number, and the call is to the telephone number.

7. A method, comprising:
   determining, by executing an instruction with a processor, a location of a cellular communication device;
   registering, by executing an instruction with the processor, a voice over Internet protocol communication device to a voice over Internet protocol service based on the location of the cellular communication device; and
   routing, by executing an instruction with the processor, a call for the cellular communication device to the voice over Internet protocol communication device based on the location, the voice over Internet protocol communication device not being implemented by the cellular communication device.

8. The method as defined in claim 7, further including updating a list of voice over Internet protocol communication devices associated with a telephone number based on the location.

9. The method as defined in claim 7, wherein the routing includes routing the call to the voice over Internet protocol communication device if the voice over Internet protocol communication device has at least one of a valid session initiated protocol registration or is enabled.

10. The method as defined in claim 7, wherein the routing includes routing the call to the voice over Internet protocol communication device if the cellular communication device is located in a voice over Internet protocol service area with the voice over Internet protocol communication device.

11. The method as defined in claim 7, further including receiving a location notification for the cellular communication device, wherein the location is determined from the location notification.

12. The method as defined in claim 7, further including associating the cellular communication device and the voice over Internet protocol communication device with a same telephone number, and the call is to the telephone number.

13. A tangible machine readable storage device comprising instructions that, when executed, cause a processor of a communication device to perform operations including:
    determining a location of a cellular communication device;
    registering a voice over Internet protocol communication device to a voice over Internet protocol service based on the location of the cellular communication device; and
    routing a call for the cellular communication device to the voice over Internet protocol communication device based on the location, the voice over Internet protocol communication device not being implemented by the cellular communication device.

14. The tangible machine readable storage device as defined in claim 13, wherein the operations further include associating the cellular communication device and the voice over Internet protocol communication device with a same telephone number, and the call is to the telephone number.

15. The tangible machine readable storage device as defined in claim 13, wherein the routing includes routing the call to the voice over Internet protocol communication device if the voice over Internet protocol communication device has at least one of a valid session initiated protocol registration or is enabled.

16. An apparatus, comprising:
    memory including machine readable instructions; and
    a processor to execute the machine readable instructions to perform operations including:
       determining a location of a cellular communication device;
       registering a voice over Internet protocol communication device to a voice over Internet protocol service if the cellular communication device is present in a voice over Internet protocol service area;
       routing a call for the cellular communication device via the voice over Internet protocol service to the voice over Internet protocol communication device if the cellular communication device is present in the voice over Internet protocol service area; and
       routing the call to the cellular communication device via a cellular communication network if the cellular communication device is absent from the voice over Internet protocol service area.

17. The apparatus as defined in claim 16, wherein the cellular communication device is associated with a telephone number, and wherein the call is to the telephone number.

18. The apparatus as defined in claim 16, wherein the processor is to receive a location notification for the cellular communication device, wherein the location is determined from the location notification.

19. The apparatus as defined in claim 16, wherein the processor is to update a list of voice over Internet protocol communication devices associated with a telephone number based on the location.

\* \* \* \* \*